(12) United States Patent
Haefner et al.

(10) Patent No.: US 10,242,180 B2
(45) Date of Patent: Mar. 26, 2019

(54) COMPONENT PROTECTION FRAMEWORKS USING DEFENSIVE PATTERNS

(71) Applicant: SAP SE, Walldorf (DE)

(72) Inventors: Christoph Haefner, Karlsruhe (DE); Martin Johns, Karlsruhe (DE); Martin Haerterich, Wiesloch (DE)

(73) Assignee: SAP SE, Walldorf (DE)

( * ) Notice: Subject to any disclaimer, the term of this patent is extended or adjusted under 35 U.S.C. 154(b) by 206 days.

(21) Appl. No.: 15/403,603

(22) Filed: Jan. 11, 2017

(65) Prior Publication Data

US 2018/0196939 A1   Jul. 12, 2018

(51) Int. Cl.
*H04L 29/06* (2006.01)
*G06F 21/53* (2013.01)

(52) U.S. Cl.
CPC ........ *G06F 21/53* (2013.01); *G06F 2221/033* (2013.01)

(58) Field of Classification Search
CPC ....................................................... G06F 21/53
USPC ................................................................ 726/22
See application file for complete search history.

(56) References Cited

U.S. PATENT DOCUMENTS

| 9,680,947 | B2 * | 6/2017 | Yao | G06F 21/6218 |
| 2013/0275951 | A1 * | 10/2013 | Dolby | G06F 11/366 717/126 |
| 2013/0275973 | A1 * | 10/2013 | Greenfield | G06F 9/44584 718/1 |

OTHER PUBLICATIONS

Stock—"Precise Client-side Protection against DOM-based Cross-site Scripting" in 23rd USENIX Security Symposium, Aug. 2014.*
Adam Barth, The Web Origin Concept, RFC 6454, Dec. 2011, url: https://tools.ietf.org/html/rfc6454 (visited on Sep. 15, 2016).
Addy Osmani, Learning JavaScript Design Patterns, O'Reilly Media, 2012. isbn:9781449334871, url: http://swbplus.bsz-bw.de/bsz371668891cov.htm.
Tongbo Luo et al., "Attacks on WebView in the Android system", In: Proceedings of the 27th Annual Computer Security Applications Conference, ACM, 2011, pp. 343-352, url: http://dl.acm.org/citation.cfm?id=2076781 (visited on Jul. 4, 2016).
Amit Klein, "DOM Based Cross Site Scripting or XSS of the Third Kind", In: 4.Web Application Security Consortium, Articles (Apr. 2005), pp. 365-372, url: http://www.webappsec.org/projects/articles/071105.shtml (visited on Aug. 18, 2016).
Apple Inc., Apple Announces iOS 8 Available Sep. 17, Press Info, Sep. 2014, url: https://www.apple.com/pr/library/2014/09/09Apple-Announces-iOS-8-Available-September-17.html (visited on Aug. 22, 2016).

(Continued)

*Primary Examiner* — Longbit Chai
(74) *Attorney, Agent, or Firm* — Jones Day

(57) ABSTRACT

Systems and methods are provided herein for establishing a protection framework for a component. Identified assets of a component requiring protection from a potential attack are received. A list of assets is generated based on the identified assets. A protection framework is configured to include at least one defensive pattern to protect the list of assets against the potential attack. The protection framework is executed to establish a hardened boundary between the component and an attack surface of the component.

20 Claims, 7 Drawing Sheets

(56) References Cited

OTHER PUBLICATIONS

Tim Berners-Lee, Information Management: A Proposal, Mar. 1989, url: https://www.w3.org/History/1989/proposal.html (visited on Oct. 23, 2016).
Ben Stock et al. "Precise client-side protection against dom-based cross-site scripting". eng. In: 23rd USENIX Security Symposium (USENIX Security 14). USENIX Association, 2014, pp. 655-670. isbn: 978-1-931971-15-7. url: https://www.usenix.org/system/files/conference/usenixsecurity14/sec14-paper-stock.pdf.
Bert Bos et al. Cascading Style Sheets Level 2 Revision 2 (CSS 2.2) Specification. Apr. 2016. url: https://www.w3.org/TR/CSS22/ (visited on Oct. 23, 2016).
Brandon Sterne, 656433—Disallow javascript: and data: URLs entered into the location bar from inheriting the principal of the currently-loaded page, Bugtracker, May 2011, url: https://bugzilla.mozilla.org/show_bug.cgi?id=656433 (visited on Sep. 4, 2016).
Center, CERT Coordination, Malicious HTML Tags Embedded in Client Web Requests, Tech. rep. Advisory CA-2000-02, CERT/CC, Feb. 2000, url: https://www.cert.org/historical/advisories/CA-2000-02.cfm? (visited on Aug. 18, 2016).
Charles Severance, "JavaScript: Designing a Language in 10 Days", In: Computer 2.45 (Feb. 2012), pp. 7-8, doi: 10.1109/MC.2012.57, url: https://www.computer.org/csdl/mags/co/2012/02/mco2012020007.pdf (visited on Sep. 15, 2016).
Daniel Bates, Adam Barth, and Collin Jackson, "Regular expressions considered harmful in client-side XSS filters", In: Proceedings of the 19th international conference on World wide web. ACM, 2010, pp. 91-100, url: http://dl.acm.org/citation.cfm?id=1772701 (visited on Jul. 4, 2016).
Tim Berners-Lee and Daniel Conolly, Hypertext Markup Language (HTML), Jun. 1993, url: https://www.w3.org/MarkUp/draft-ietf-iiir-html-01.txt (visited on Oct. 23, 2016).
Tim Berners-Lee and Daniel Connolly, Hypertext Markup Language—2.0, Nov. 1995, url: https://tools.ietf.org/html/rfc1866 (visited on Oct. 23, 2016).
Sebastian Lekies, Ben Stock, and Martin Johns, "25 million flows later: large-scale detection of DOM-based XSS", In: ACM Press, 2013, pp. 1193-1204, isbn: 978-1-4503-2477-9, doi:10.1145/2508859.2516703, url: http://dl.acm.org/citation.cfm?doid=2508859.2516703 (visited on Jul. 4, 2016).
Phu H. Phung, David Sands, and Andrey Chudnov, "Lightweight self-protecting JavaScript", In: Proceedings of the 4th International Symposium on Information, Computer, and Communications Security, ACM, 2009, pp. 47-60, url: http://dl.acm.org/citation.cfm?id=1533067 (visited on Jun. 20, 2016).
ECMA International, Standard ECMA-262, Jun. 2016, url: http://www.ecma-international.org/publications/standards/Ecma-262.htm (visited on Sep. 13, 2016).
ECMA, ECMAScript Language Specification, 2011, url: http://www.ecma-international.org/publications/files/ECMA-ST/Ecma-262.pdf.
Philip M. Gollucci, apache.org incident report for Apr. 9, 2010, Blog, Apr. 2010, url:https://blogs.apache.org/infra/entry/apache_org_04_09_2010 (visited on Jul. 13, 2016).
Facebook Inc., How does a Self-XSS scam work? Helpcenter, url: https://www.facebook.com/help/246962205475854 (visited on Sep. 4, 2016).
Google Inc., WebView | Android Developers, Developer Documentation, url: https://developer.android.com/reference/android/webkit/WebView.html (visited on Aug. 15, 2016).
Gustav Rydstedt et al., "Busting frame busting: A study of clickjacking vulnerabilities at popular sites", In: IEEE Oakland Web 2 (2010), p. 6, url: http://w2spconf.com/2010/papers/p27.pdf (visited on Jul. 4, 2016).
Jesse Ruderman, 971597—"Self-XSS" attacks that involve developer tools, Nov. 2014, url: https://bugzilla.mozilla.org/show_bug.cgi?id=971597 (visited on Aug. 17, 2016).
Jill Scharr, Facebook Scam Tricks Users Into Hacking Themselves, Jul. 2014, url: http://www.tomsguide.com/us/facebook-self-xss,news-19224.html (visited on Aug. 17, 2016).
Joey Tyson, Recent Facebook XSS Attacks Show Increasing Sophistication | Social Hacking, Apr. 2011, url: http://theharmonyguy.com/oldsite/2011/04/21/recent-facebook-xss-attacks-show-increasing-sophistication/ (visited on Sep. 4, 2016).
Josh Constine, Facebook Rolls Out Login Approvals and Security Protections Against Clickjacking and Self-XSS, Mar. 2011, url: http://www.adweek.com/socialtimes/login-approvals-clickjacking-xss/262572 (visited on Sep. 4, 2016).
Nick Nikiforakis et al., "You are what you include: large-scale evaluation of remote javascript inclusions", In: Proceedings of the 2012 ACM conference on Computer and communications security, ACM, 2012, pp. 736-747, url: http://dl.acm.org/citation.cfm?id=2382274 (visited on Jul. 21, 2016).
Manish Mittal, Issue 345205—chromium—DevTools: Combat self-xss—Monorail, Feb. 2014, url: https://bugs.chromium.org/p/chromium/issues/detail?id=345205 (visited on Aug. 17, 2016).
Mario Heiderich, Tilman Frosch, and Thorsten Holz, "IceShield: detection and mitigation of malicious websites with a frozen DOM", In: Recent Advances in Intrusion Detection, Springer, 2011, pp. 281-300, url: http://link.springer.com/10.1007%2F978-3-642-23644-0_15 (visited on Jun. 10, 2016).
Martin Johns and Sebastian Lekies, "Tamper-resistant likejacking protection", In: International Workshop on Recent Advances in Intrusion Detection. Springer, 2013, pp. 265-285. url: http://link.springer.com/chapter/10.1007/978-3-642-41284-4_14 (visited on Jul. 4, 2016).
MDN, Object.defineProperty(), Developer Documentation, Jun. 2016, url: https://developer.mozilla.org/en-US/docs/Web/JavaScript/Reference/Global_Objects/Object/defineProperty (visited on Jun. 27, 2016).
MDN, Object.freeze(), Developer Documentation, Apr. 2016, url: https://developer.mozilla.org/en-US/docs/Web/JavaScript/Reference/Global_Objects/Object/freeze (visited on Jun. 23, 2016).
MDN, Object.prototype.watch(), Developer Documentation, Nov. 2016, url: https://developer.mozilla.org/en-US/docs/Web/JavaScript/Reference/Global_Objects/Object/watch (visited on Aug. 11, 2016).
MDN, Object.seal(), Developer Documentation, Apr. 2016, url: https://developer.mozilla.org/en-US/docs/Web/JavaScript/Reference/Global_Objects/Object/seal (visited on Jun. 23, 2016).
MDN, onresize, Developer Documentation, Jun. 2016, url: https://developer.mozilla.org/en-US/docs/Web/API/GlobalEventHandlers/onresize (visited on Jun. 24, 2016).
MDN, Proxy, Developer Documentation, Aug. 2016, url: https://developer.mozilla.org/de/docs/Web/JavaScript/Reference/Global_Objects/Proxy (visited on Oct. 5, 2016).
MDN, XMLHttpRequest, Developer Documentation, Jun. 2016, url: https://developer.mozilla.org/en-US/docs/Web/API/XMLHttpRequest (visited on Jun. 24, 2016).
Microsoft, JScript (ECMAScript3), url: https://msdn.microsoft.com/library/hbxc2t98.aspx (visited on Sep. 29, 2016).
Mike Belshe, Martin Thomson, and Roberto Peon, Hypertext Transfer Protocol Version 2 (HTTP/2), May 2015, url: https://tools.ietf.org/html/rfc7540 (visited on Oct. 23, 2016).
Nathan Hammond, 527530—Social Engineering Issue with "javascript:" URLs [read bug #680302 before commenting here], Bugtracker, url: https://bugzilla.mozilla.org/show_bug.cgi?id=527530 (visited on Sep. 4, 2016).
Netmarketshare, Market share for mobile, browsers, operating systems and search engines, Sep. 2016, url: https://www.netmarketshare.com/ (visited on Oct. 23, 2016).

\* cited by examiner

```
1  (function() {
2    // component code
3    var component = {};
4    component.isFramed = (top.location != location);
5  })();
6
7  // attacker code
8  component.isFramed = undefined;
9  // Throws ReferenceError: component is not defined
```

FIG. 2

```
1   // Tamper-Proof window.XMLHttpRequest
2   Object.defineProperty(window, 'XMLHttpRequest', {configurable: false, writable:
        false});
3
4   // Attribute 'XMLHttpRequest' is now tamper-proofed
5   delete window.XMLHttpRequest;
6   // false
7   window.XMLHttpRequest = function() { console.log("Attacker controlled function")
        ; };
8   // fails silently
9   window.XMLHttpRequest.toString();
10  //"function XMLHttpRequest() {
11  //    [native code]
12  //}"
13  Object.defineProperty(window, 'XMLHttpRequest', {configurable: true, writable:
        true});
14  //TypeError: can't redefine non-configurable property "XMLHttpRequest" (Firefox
        47)

15  //Uncaught TypeError: Cannot redefine property: XMLHttpRequest (Chrome 60)
```

FIG. 3

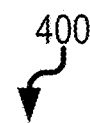

```
1    var oldXMLHttpRequest = window.XMLHttpRequest;
2    window.XMLHttpRequest = new Proxy({
3       construct: function(target, argumentsList) {
4          return Object.seal(new Proxy(new oldXMLHttpRequest, {
5             // custom behavior
6          }));
7       }
8    });
9    // Protect the prototype
10   /// First stage: Object.seal
11   Object.seal(window.XMLHttpRequest.prototype);
12   /// Second stage: Set a handpicked list of attributes writable=false
13   ["open", "setRequestHeader", "send", "abort"].forEach((attribute) => {
14      Object.defineProperty(window.XMLHttpRequest.prototype, attribute, {writable:
            false});
15   });
16
17   // Attacker code
18   XMLHttpRequest.prototype.setRequestHeader =
19   function() { /* attacker code */ };
20   // fails silently
```

FIG. 4

```
1   (function() {
2     window.watch('onmousemove',
3     function (id, oldVal, newVal) {
4       return function(event) {
5         // component code
6         newVal.apply(this, arguments);
7       };
8     });
9   })();
10
11  // Attacker code
12  window.onmousemove = function(event) {
13    // attacker code
14  }
15  // Both, attacker code AND component code get executed
```

FIG. 5

COMPONENT PROTECTION FRAMEWORKS USING DEFENSIVE PATTERNS

TECHNICAL FIELD

The subject matter described herein relates to establishing component protection frameworks using defensive patterns.

BACKGROUND

Modern web applications rely heavily on client-side functionality, implemented in the form of components running in a web browser. Components can carry security sensitive information, implement critical business logic, or provide trusted user interfaces to a user. As a result, components can be susceptible to attacks. In order to attack a component, an attacker has to be able to execute attacking code within the same web browser in which the component is located.

SUMMARY

In one aspect, a protection framework for a component is established by receiving identified assets of a component requiring protection from a potential attack. The identified assets can be provided by a user via a graphical user interface. The component can be, for example, a Java Script component. A list of assets is generated, by the at least one data processor, based on the identified assets. A protection framework is configured with at least one defensive pattern to protect the list of assets against the potential attack. The protection framework is executed to establish a hardened boundary between the component and an attack surface of the component. The protection framework can be executed prior to execution of code of the potential attack. In some variations, at least one defensive pattern can be selected by a user via a graphical user interface.

A defensive pattern can include an immediately-invoked function pattern, global object pattern, constructor pattern, or an on-attributes pattern. The hardened boundary can be established, using the immediately-invoked function pattern, by encapsulating the component within an anonymous immediately-invoked function. The hardened boundary, using a global object pattern, can be established by setting select attributes of a global object of the component to false. Using the constructor pattern, the hardened boundary can be established by (i) sealing a returned proxy object of the component, (ii) sealing a prototype of the component, and (iii) modifying write permissions of a list of attributes belonging to the prototype. Alternatively, using the on-attributes pattern, the hardened boundary can be established by intercepting read and write permissions associated with objects of the component through use of a registered handle.

In some variations, systems can be provided for implementing various operations described herein that include at least one data processor and memory. In other variations, computer-programmable products can be provided for implementing various operations described herein.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides an ability to isolate an attack surface of a component through establishing a hardened boundary between the attack surface and the component. The hardened boundary prevents an attacker from gaining access to information within the component. Establishing a protection framework using the various defensive patterns as described herein protects against attack methods typically used by adversaries in an attack. For example, the defensive patterns described herein can prevent against exposure of global variables of a component or public methods, alteration or access to shared resources between components, redefining of an implementation of the component, or rerouting of event-handling used by the component.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 2 is an example immediately-invoked function pattern;

FIG. 3 is an example global object pattern;

FIG. 4 is an example constructor pattern;

FIG. 5 is an example on-attributes pattern;

Like reference symbols in the various drawings indicate like elements.

DETAILED DESCRIPTION

Establishing component protection frameworks using defensive patterns provides protection against client-side attacks by creating a hardened boundary between a component and its corresponding attack surface. A protection framework can be configured with defensive patterns that can be used either independently against a particular attack type or in combination to provide isolation from various attack types.

Figure 1:
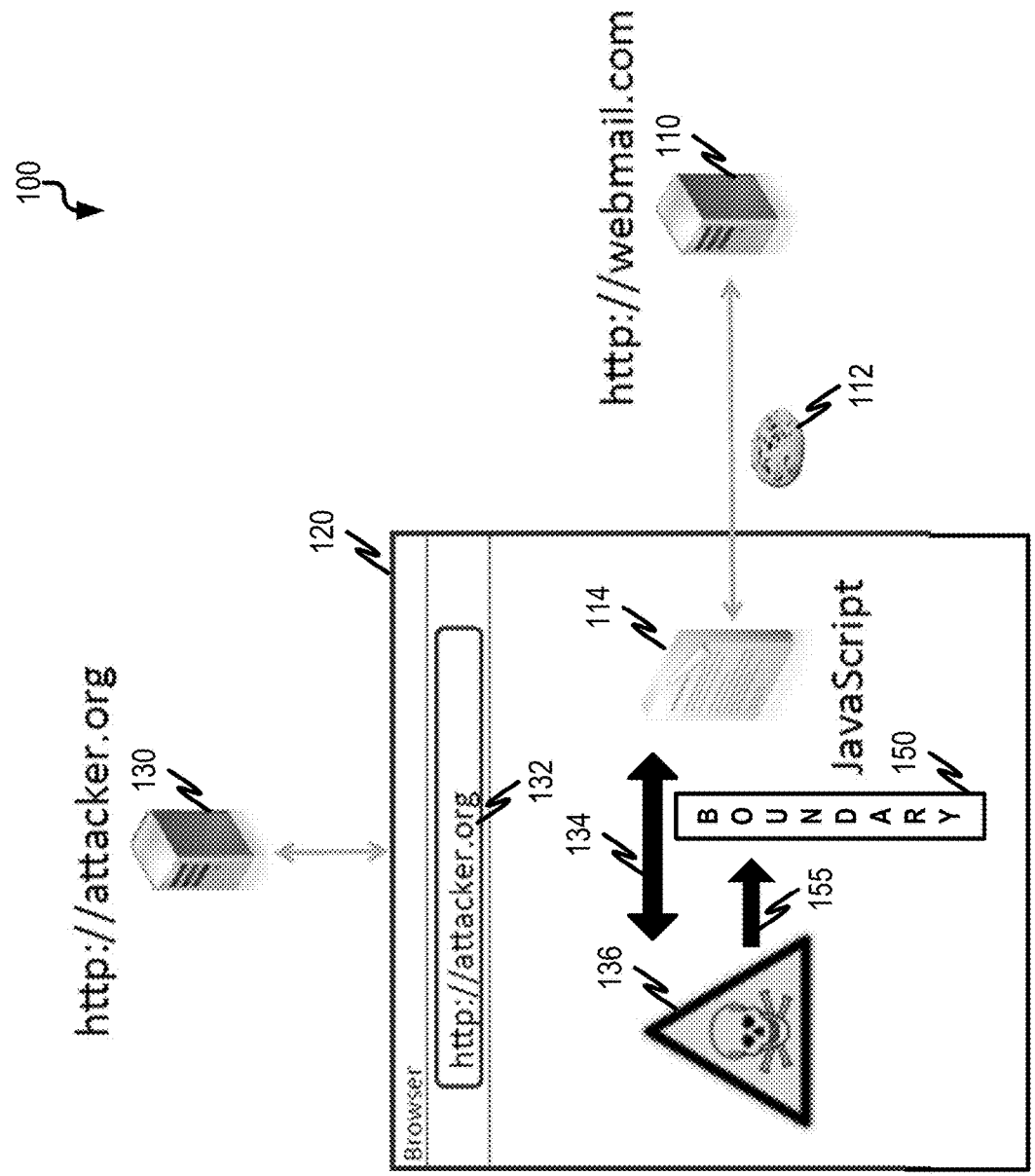
FIG. 1 is system block diagram of a potential attack environment.

FIG. 1 is system block diagram 100 of a potential attack environment. More specifically, the potential attack environment is a malicious cross-origin integration attack type. In this example, a user authenticates to an email provider (i.e., http://webmail.com) using server 110. Upon authentication, browser 120 automatically attaches corresponding authentication session cookies 112 to requests targeting the email provider, which utilizes a session-state dependent, dynamic script component 114. Dynamic script component 114 executes within the execution environment of browser 120. When the user is logged into the email provider using server 110, dynamic script component 114 corresponding to the email provider creates a global variable containing the current user's email address. Using browser 120, the user can navigate to an attacker-controlled website 132 (i.e., http://attacker.org) hosted on server 130. The attacker-controlled website can provide an attack component 136 within browser 120. Attack component 136 can make requests, via communication pathway 134, to the dynamic script component 114 for information. As result, upon visiting the attacker-controlled website 132, browser 120 can send a request for dynamic script component 114 which retrieves the authentication session cookies 112. The authentication session cookies 112 are then provided to the attacker component 136 via communication pathway 134. Although the dynamic script component 114 originated from the email provider, the dynamic script component 114 is executed in the same execution environment as the attacker component 136. The execution within the same environment creates a global variable with the user's email within the attacker-controlled website 132. Once the attacker-controller website 132 creates the global variable, the global variable is accessible to other scripts which can be executed by the attacker-controlled website 132.

In order to protect the dynamic script component 114 from attacker component 136, a hardened boundary 150 can be established through execution of a protection framework. The hardened boundary 150 can be between the dynamic script component 114 and an attack surface (not shown) of the dynamic script component 114. Isolation between trusted and untrusted code of the attacker component 136 can be provided by hardened boundary 150. For example, attempts by untrusted code of attacker component 136 would be prevented by hardened boundary 150 via communication pathway 155, such that information is not provided along by dynamic script component 114.

Component protection frameworks can be used for protection of a variety of different types of components in which the components are vulnerable to attacks. One example is in connection with JavaScript components. JavaScript components can come in a variety of prevalent types including, for example, first party components, third party components, or cross-origin widgets. First party JavaScript components, for example, can exist in the form of dedicated JavaScript HTTP resources which are included in websites using a src attribute of the HTML script-tag. Third party JavaScript libraries can be a collection of JavaScript code offered by service providers. Cross-origin widgets can include, for example, mapping services that allow web applications to present dynamically loaded maps into websites or social networking components.

JavaScript components can be targeted by various attack environments including, for example, malicious cross-origin integration, cross-site scripting (XSS), self-XSS, or JavaScript injection in WebViews. Attacks can target one or more classic security properties of a JavaScript component such as integrity, confidentiality, or availability. Integrity attacks target changing the behavior of the JavaScript component or the displayed information, e.g., through altering the utilized global JavaScript Application Programming Interfaces (APIs). Confidentiality attacks target leaking information that is meant to be private to the JavaScript component. An availability attack targets disabling of the JavaScript component, i.e., through removing or deleting crucial JavaScript functionality.

Tampering with a JavaScript component can occur if an attacker has obtained either a reference to a resource, which is used by the component, or causes an event, that indirectly affects the component's functionality. An attacker can do this in one of four ways by: (i) directly accessing references exposed by the JavaScript component, such as global variables or public methods, (ii) accessing and/or altering shared resources in the global JavaScript execution context, (iii) redefining the implementation or prototype of global JavaScript objects and APIs, or (iv) rerouting event-handling used by the component.

The protection framework can result in a JavaScript library for inclusion within a web document. One or more defensive patterns can be included within the protection framework. The protection framework can be configured based on user selection of defensive patterns. The defensive patterns can be selected by a user based upon a specific attack type or a collection of attack types wherein more than one pattern can be included within the protection framework. The defensive patterns can include, for example, an immediately-invoked function pattern, a global object pattern, a constructor pattern, or an on-attributes pattern. Each defensive pattern establishes the hardened boundary 150 in a different way.

FIG. 2 is an example immediately-invoked function pattern 200. An immediately-invoked function pattern 200 is an anonymous function which is executed immediately after definition. This defensive pattern can be used against, for example, a potential attack where an attack component 136 can access a state saved within an object of dynamic script component 114. Even if code of the dynamic script component 114 has the privilege to run prior to the code of attacker component 136, attacker component 136 can have access to the implementation of dynamic script component 114 and can modify, for example, variable values within dynamic script component 114.

Using the immediately-invoked function pattern 200, the hardened boundary 150 is established by wrapping the dynamic script component 114 in one anonymous immediately invoked function to encapsulate the dynamic script component 114 from the rest of the execution space. This allows dynamic script component 114 to store, read and write variables, and execute code inside its own function scope without leaking information to the execution space (i.e., browser 120). The immediately-invoked function pattern 200 leaves no handle or reference for the attack component 136 to access.

FIG. 3 is an example global object pattern 300. A global object pattern 300 establishes a hardened boundary 150 by setting select properties of a global object of dynamic script component 114 to false. For example, a global object with Object.defineProperty can be set to false such as properties configurable and writable. With configurable set to false only, attacker component 136 can still modify the value and attribute of writeable. With writable also set to false, attacker component 136 cannot modify the values of a property within dynamic script component 114. Setting both properties of configurable and writeable to false, results in an unchangeable and undeletable tamper-proof property of dynamic script component 114.

FIG. 4 is an example constructor pattern 400. A constructor pattern 400 ensures that attacker component 136 does not change code within dynamic script component 114. Using a constructor pattern 400, a hardened boundary 150 is established by protecting a returned proxy object with Object.seal to prevent new properties from being added to the returned proxy object and marks existing properties of the returned proxy object as non-configurable. This allows for modification of attributes having writeable set to true. A prototype can be sealed using Object.seal. The write permission of a list of attributes belonging to the prototype can be set to false in order to keep those attributes required for compatibility purposes available for modification.

FIG. 5 is an example on-attributes pattern 500. An on-attributes pattern can provide for event registration (i.e., onmousemovement). A hardened boundary 150 is established by intercepting read and write permissions associated with objects of the dynamic script component 114 through use of a registered handle. The registered handle can be monitored using Object.watch. On write access attempts, instead of a user provided value being passed, a new function is constructed. This new function executes the code associated with dynamic script component 114 and provides the user function after execution.

Figure 6:
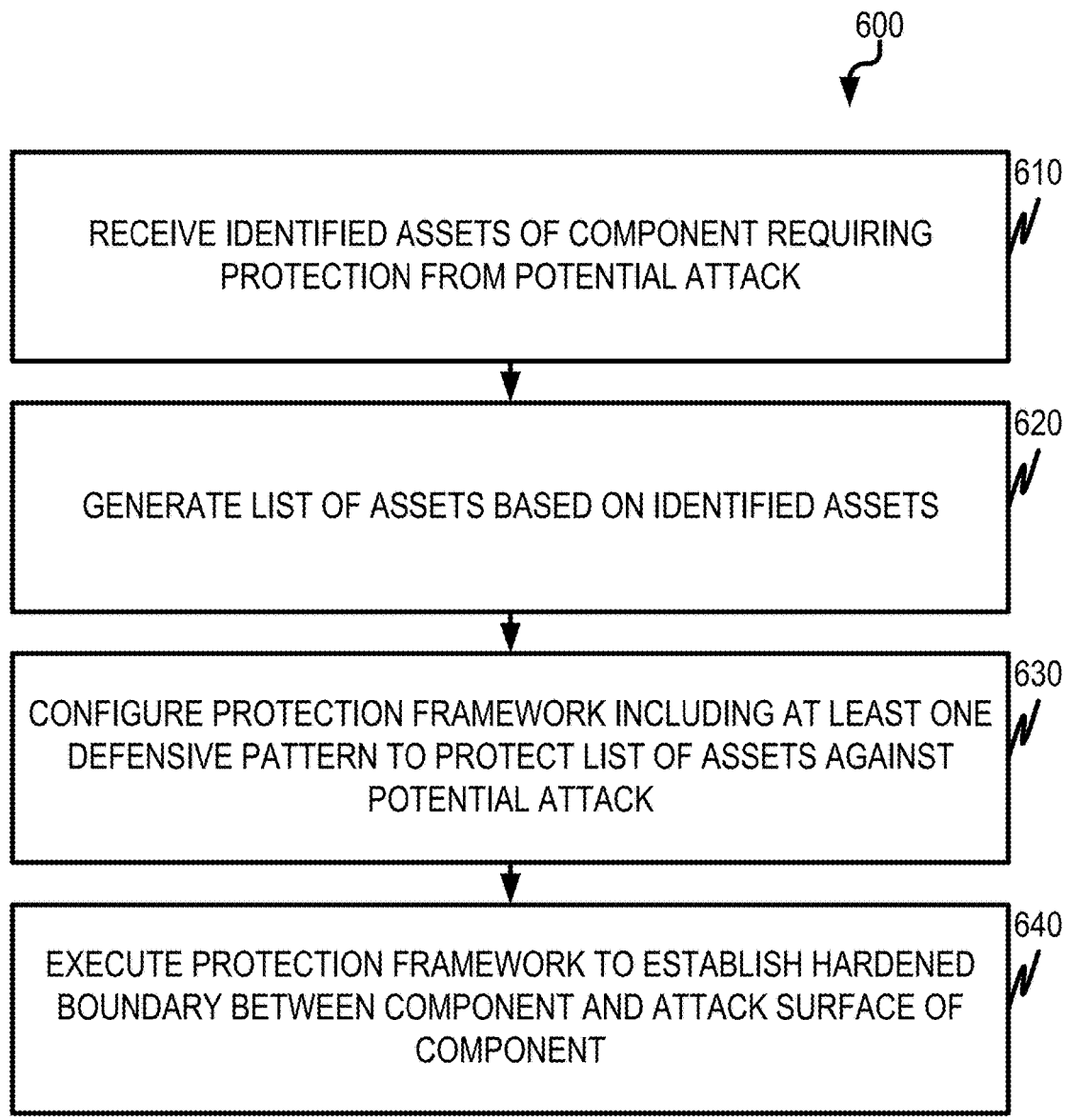
FIG. 6 is an example process flow diagram for establishing component protection frameworks using defensive patterns.

FIG. 6 is an example process flow diagram for establishing component protection frameworks using defensive patterns. Identified assets of a component requiring protection from a potential attack can be received, at 610. The identified asset can be provided by a user via a graphical user interface. A list of assets based on the identified assets can be generated, at 620. A protection framework can be configured, at 630, including at least one defensive pattern to protect the list of assets against the potential attack. The protection framework can be executed, at 640, to establish a hardened boundary between the component and an attack surface of the component. Execution of the protection framework can occur prior to execution of code of attack component 136.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random access memory associated with one or more physical processor cores.

Figure 7:
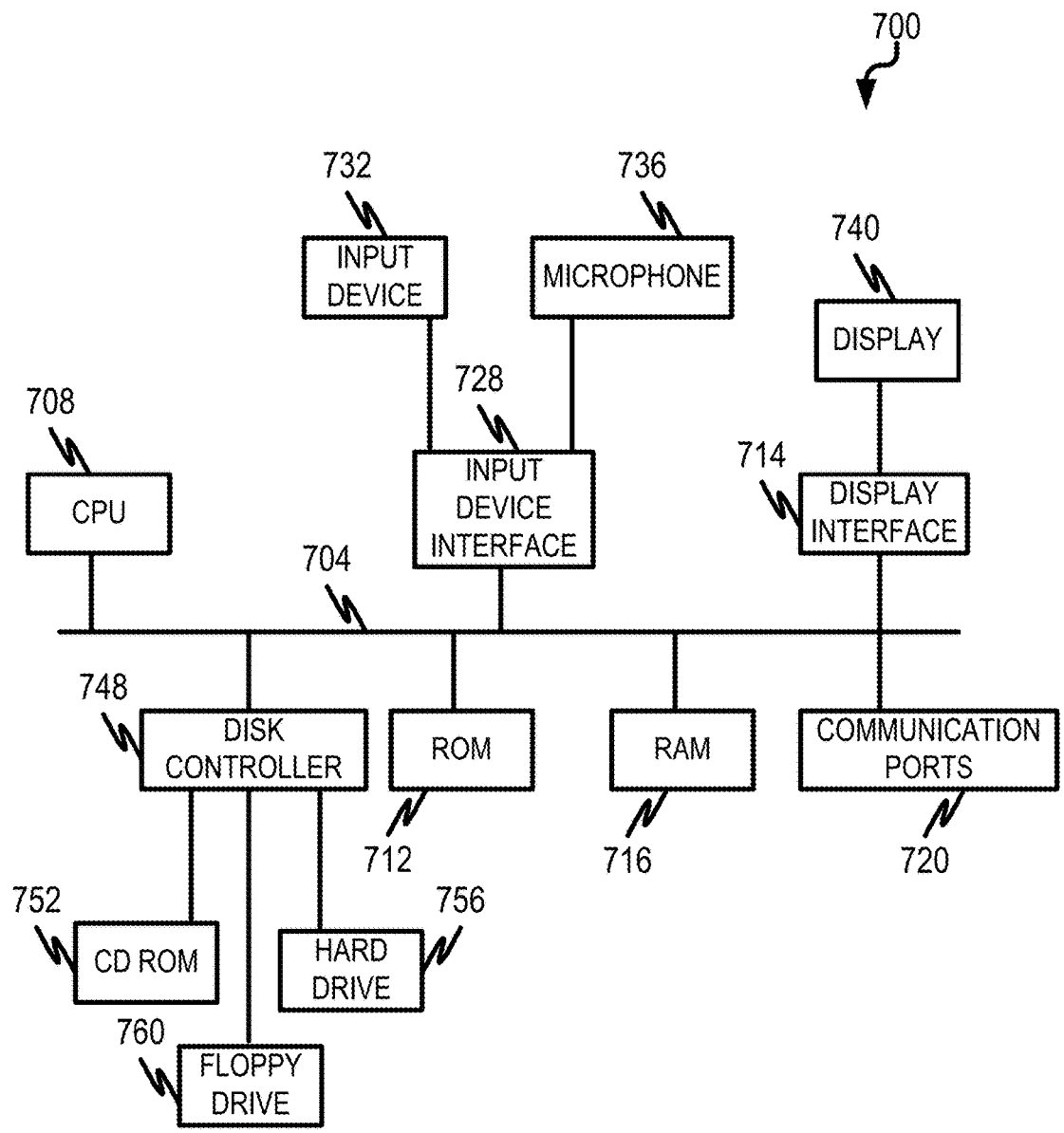
FIG. 7 is a diagram illustrating a sample computing device architecture for implementing various aspects described herein.

FIG. 7 is a diagram 700 illustrating a sample computing device architecture for implementing various aspects described herein. A bus 704 can serve as the information highway interconnecting the other illustrated components of the hardware. A processing system 708 labeled CPU (central processing unit) (e.g., one or more computer processors/data processors at a given computer or at multiple computers), can perform calculations and logic operations required to execute a program. A non-transitory processor-readable storage medium, such as read only memory (ROM) 712 and random access memory (RAM) 716, can be in communication with the processing system 708 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 748 can interface one or more optional disk drives to the system bus 704. These disk drives can be external or internal floppy disk drives such as 760, external or internal CD-ROM, CD-R, CD-RW or DVD, or solid state drives such as 752, or external or internal hard drives 756. As indicated previously, these various disk drives 752, 756, 760 and disk controllers are optional devices. The system bus 704 can also include at least one communication port 720 to allow for communication with external devices either physically connected to the computing system or available externally through a wired or wireless network. In some cases, the communication port 720 includes or otherwise comprises a network interface.

To provide for interaction with a user, the subject matter described herein can be implemented on a computing device having a display device 740 (e.g., a CRT (cathode ray tube) or LCD (liquid crystal display) monitor) for displaying information obtained from the bus 704 to the user and an input device 732 such as keyboard and/or a pointing device (e.g., a mouse or a trackball) and/or a touchscreen by which the user can provide input to the computer. Other kinds of input devices 732 can be used to provide for interaction with a user as well; for example, feedback provided to the user can be any form of sensory feedback (e.g., visual feedback, auditory feedback by way of a microphone 736, or tactile feedback); and input from the user can be received in any form, including acoustic, speech, or tactile input. In the input device 732 and the microphone 736 can be coupled to and convey information via the bus 704 by way of an input device interface 728. Other computing devices, such as dedicated servers, can omit one or more of the display 740 and display interface 714, the input device 732, the microphone 736, and input device interface 728.

To provide for interaction with a user, the subject matter described herein can be implemented on a computer having a display device (e.g., a CRT (cathode ray tube) or LCD (liquid crystal display) monitor) for displaying information to the user and a keyboard and a pointing device (e.g., a mouse or a trackball) and/or a touchscreen by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for establishing a protection framework for a component, the method being implemented by one or more data processors forming one or more computing devices and comprising:
   receiving, by at least one data processor, identified assets of a component requiring protection from a potential attack;
   generating, by the at least one data processor, a list of assets based on the identified assets;
   configuring, by the at least one data processor, a protection framework including at least one defensive pattern to protect the list of assets against the potential attack; and
   executing, by the at least one data processor, the protection framework to establish a hardened boundary between the component and an attack surface of the component;
   wherein the at least one defensive pattern is a constructor pattern and the hardened boundary is established by (i) sealing a returned proxy object of the component such that the returned proxy object is protected to prevent new properties from being added to the returned proxy object and marks existing properties of the returned proxy object as non-configurable (ii) sealing a prototype of the component, and (iii) modifying write permissions of a list of attributes belonging to the prototype.

2. The method according to claim 1, further comprising: selecting, by a user via a graphical user interface, the at least one defensive pattern.

3. The method according to claim 1, wherein the at least one defensive pattern is an immediately-invoked function pattern and the hardened boundary is established by encapsulating the component within an anonymous immediately-invoked function.

4. The method according to claim 1, wherein the at least one defensive pattern is a global object pattern and the hardened boundary is established by setting select attributes of a global object of the component to false.

5. The method according to claim 1, wherein the at least one defensive pattern is an on-attributes pattern and the hardened boundary is established by intercepting read and write permissions associated with objects of the component through use of a registered handle.

6. The method according to claim 1, wherein the component is a Java Script component.

7. The method according to claim 1, wherein the identified assets are identified by a user through a graphical user interface.

8. The method according to claim 1, wherein the protection framework is executed prior to execution of code of the potential attack.

9. A non-transitory computer-programmable product for establishing a protection framework for a component, the computer-programmable product storing instructions which, when executed by at least one data processor, result in operations comprising:
   receiving identified assets of a component requiring protection from a potential attack;
   generating a list of assets based on the identified assets;
   configuring a protection framework including at least one defensive pattern to protect the list of assets against the potential attack; and
   executing the protection framework to establish a hardened boundary between the component and an attack surface of the component;
   wherein the at least one defensive pattern is a constructor pattern and the hardened boundary is established by (i) sealing a returned proxy object of the component such that the returned proxy object is protected to prevent new properties from being added to the returned proxy object and marks existing properties of the returned proxy object as non-configurable (ii) sealing a prototype of the component, and (iii) modifying write permissions of a list of attributes belonging to the prototype.

10. The computer-programmable product according to claim 9, wherein the operations further comprise:
   selecting, by a user via a graphical user interface, the at least one defensive pattern.

11. The computer-programmable product according to claim 9, wherein the at least one defensive pattern is an immediately-invoked function pattern and the hardened boundary is established by encapsulating the component within an anonymous immediately-invoked function.

12. The computer-programmable product according to claim 9, wherein the at least one defensive pattern is a global object pattern and the hardened boundary is established by setting select attributes of a global object of the component to false.

13. The computer-programmable product according to claim 9, wherein the at least one defensive pattern is an on-attributes pattern and the hardened boundary is established by intercepting read and write permissions associated with objects of the component through use of a registered handle.

14. The computer-programmable product according to claim 9, wherein the component is a Java Script component.

15. The computer-programmable product according to claim 9, wherein the identified assets are identified by a user through a graphical user interface.

16. The computer-programmable product according to claim 9, wherein the protection framework is executed prior to execution of code of the potential attack.

17. A system establishing a protection framework for a component, the system comprising:
    at least one data processor;
    memory storing instructions which, when executed by the at least one data processor, result in operations comprising:
        receiving identified assets of a component requiring protection from a potential attack;
        generating a list of assets based on the identified assets;
        configuring a protection framework including at least one defensive pattern to protect the list of assets against the potential attack; and
        executing the protection framework to establish a hardened boundary between the component and an attack surface of the component;
    wherein the at least one defensive pattern is a constructor pattern and the hardened boundary is established by (i) sealing a returned proxy object of the component such that the returned proxy object is protected to prevent new properties from being added to the returned proxy object and marks existing properties of the returned proxy object as non-configurable (ii) sealing a prototype of the component, and (iii) modifying write permissions of a list of attributes belonging to the prototype.

18. The system according to claim 17, wherein the operations further comprise:
    selecting, by a user via a graphical user interface, the at least one defensive pattern.

19. The system of claim 17, wherein the at least one defensive pattern is an immediately-invoked function pattern and the hardened boundary is established by encapsulating the component within an anonymous immediately-invoked function.

20. The system according to claim 17, wherein the at least one defensive pattern is an on-attributes pattern and the hardened boundary is established by intercepting read and write permissions associated with objects of the component through use of a registered handle.

* * * * *